2,881,716
POWERED DOUGH FORMER

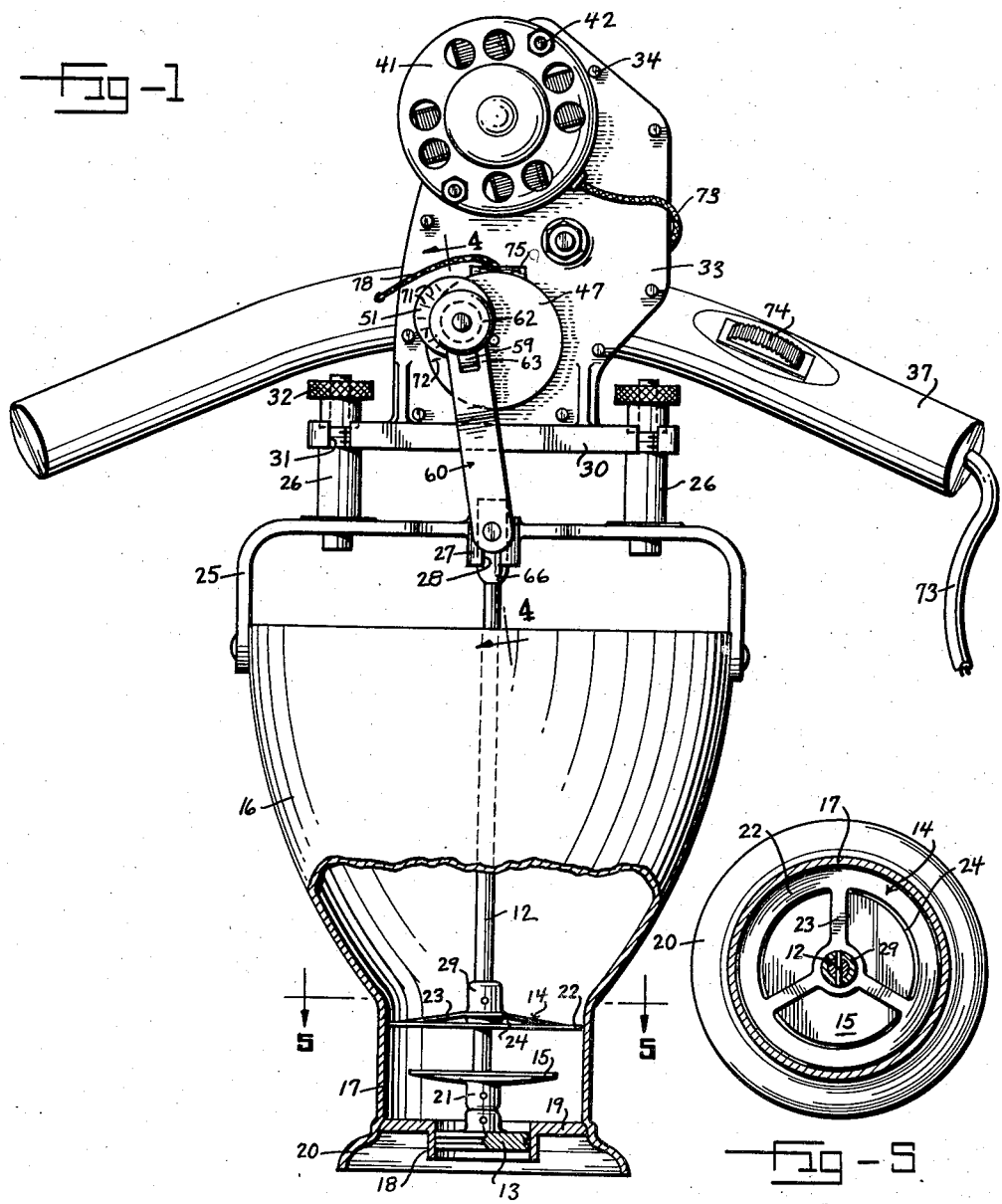

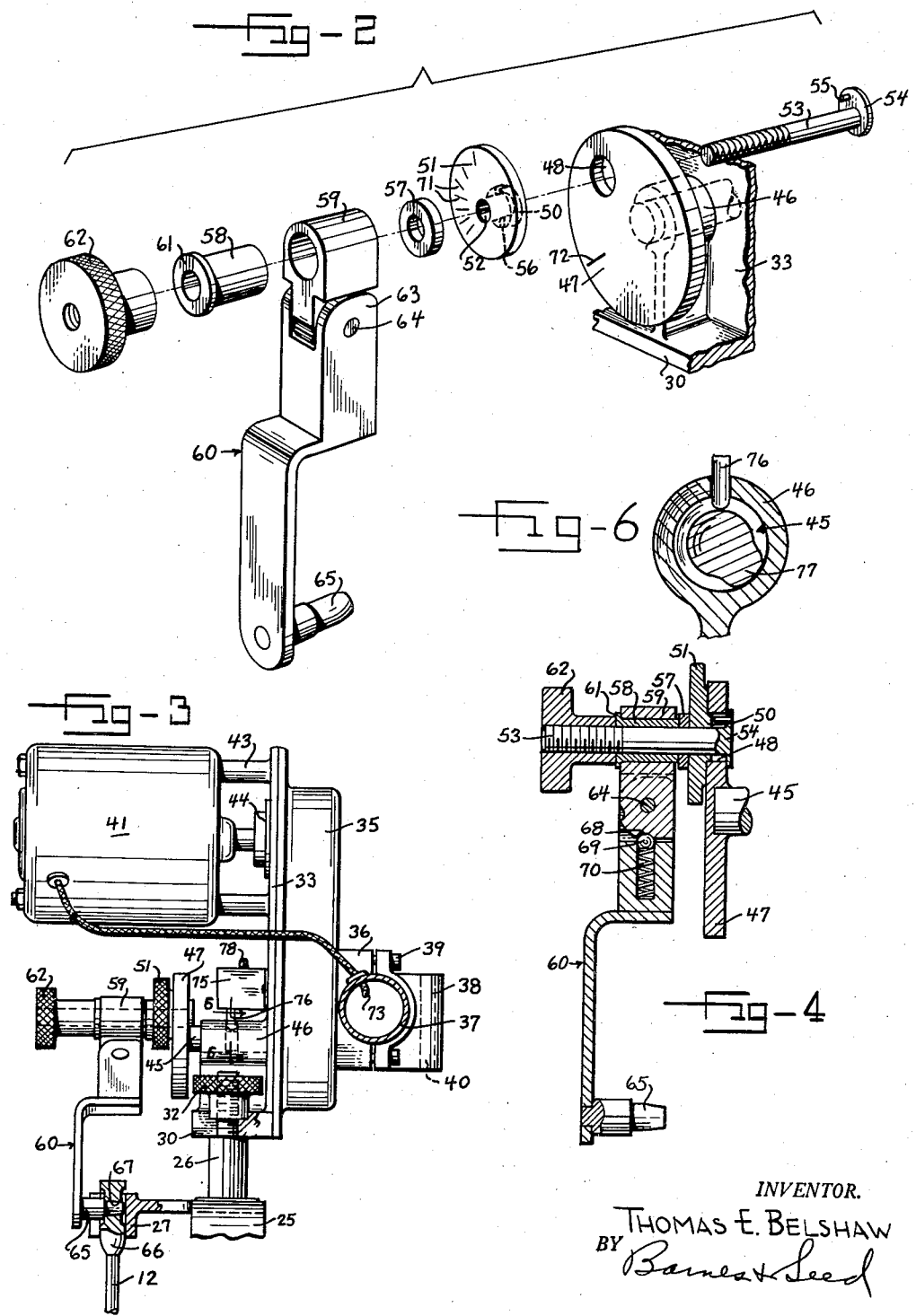

Thomas E. Belshaw, Seattle, Wash.

Application September 28, 1956, Serial No. 612,746

10 Claims. (Cl. 107—14)

This invention relates to portable dough formers which dispense individual charges of dough in a predetermined shape, and more specifically to an improved self-powered unit which may have its dough-forming mechanism of the general type disclosed in United States Patent No. 2,637,282, issued May 5, 1953.

An object of this invention is to provide a self-powered portable dough former which is of light weight construction and adapted to be held by the operator without supplementary support while in operation.

The invention further aims to provide such a self-powered former in which the power assembly can be readily detached from the hopper and dough forming mechanism so that they are free to be cleaned after use.

Another object is to provide such a dough former with an adjusting means whereby the quantity of dough in each formed charge dispensed can be easily varied.

Still a further aim of the invention is to provide a self-powered dough former which will always stop in a non-dispensing position when deactivated.

With the foregoing objects and advantages in view, and which will appear and be understood in the course of the following description and claims, the invention consists in the novel construction and in the adaptation and combination of parts hereinafter described and claimed.

In the accompanying drawings:

Figure 1 is a front elevational view of my dough former with part of the hopper broken away to show the dough forming mechanism.

Fig. 2 is an exploded view of the stroke adjusting mechanism.

Fig. 3 is a fragmentary side elevational view.

Fig. 4 is a vertical sectional view through the two-part link.

Fig. 5 is a horizontal sectional view taken on line 5—5 of Fig. 1.

Fig. 6 is a fragmentary transverse vertical sectional view taken as indicated by line 6—6 of Fig. 3.

As before mentioned, the dough forming mechanism may be of the general type disclosed in U.S. Patent No. 2,637,282, and namely one in which a rod 12 with a forming piston 13 at its lower end and carrying a check valve unit 14—15 is reciprocated in a hopper 16. This hopper is cylindrically necked at its lower end to provide a valve chamber 17 into which dough from the hopper is metered by the check valve and then discharged through a reduced discharge tube 18 carried by a circular end plate 19 fitted into the lower end of the valve chamber. A skirt 20 for serving as a stand extends laterally below the tube 18.

The check valve unit 14—15 comprises a component 14 of wheel-like configuration rigidly secured to the rod 12 and a disc-like component 15 floating on the rod and supported by a hub 21 between component 14 and the forming piston 13. Numeral 22 has been assigned to the rim of the wheel-like component and it will be noted that the latter is dished upwardly from the rim by spokes 23 which have sectorial openings 24 therebetween and are connected at their inner end to a hub 29. This hub is secured to rod 12 and desirably extends downwardly to the plane of the lower face of the rim 22. The outer diameter of the floating component 15 is preferably made slightly less than inner diameter of the rim 22 so that a small part of each sectorial opening 24 is always exposed to the valve chamber 17. These constantly exposed parts of openings 24 assure that the components 14, 15 can never stick together and yet are narrow enough to insure a substantial cut-off of dough from the hopper 16 to the valve chamber 17. Such a cut-off is possible because of the viscosity of the dough. It will be noted that the floating component 15 is dished downwardly somewhat and that its hub 21 extends upwardly to the level of its rim so that such hub can be engaged by hub 29 during downward strokes of the rod 12.

At its upper end the hopper 16 has riveted thereto a bail 25 which presents a pair of upstanding pedestals 26 and a boss 27. The latter has its bore aligned with the longitudinal axis of the valve chamber 17 and has its front face longitudinally slotted to provide an accessway 28 for introducing the shank of rod 12 laterally into the boss. At their upper ends the pedestals 26 are necked and threaded for receiving the base plate 30 of a gear box. A pair of front slots 31 in this base plate permit the latter to be introduced over the pedestal necks to be held down by nuts 32. The front plate 33 of the gear box is integral with the base plate and has screw connections 34 with the peripherial flange of a backwardly-dished rear cover plate 35. Extending rearwardly from the latter near its lower end is a saddle 36 in which is seated a tubular handle bar 37 having its ends curved forwardly. A clamp 38 secured by screws 39 to the saddle 36 complements the latter in holding the handle bar in position. In some instances the operator may desire to pivotally mount the dough former on a swing arm, and so, to receive such an arm, the clamp 38 has a vertical bore 40 located rearwardly of the handle bar.

An electric motor 41 is mounted on the front of the gear box by a pair of bolts 42 having spacing sleeves 43 and has its shaft journaled in a bearing unit 44. The motor shaft is coupled within the gear box to a suitable gear train (not shown) which reduces the speed to an output shaft 45 journaled at the lower end of the front plate 33 in a forwardly projecting boss 46. Mounted on the outer end of the output shaft is a crank which may take the form of a disc 47 having an eccentric round opening 48 formed therein. Seated in this opening 48 from the front side is a boss 50 which projects rearwardly from a dial 51. This boss has a through-bore 52 which is eccentric with respect to the center of the boss. Passing through this bore 52 is a pin 53 having an enlarged head 54 bearing against the back face of the disc 47 and having its other end externally threaded. This pin 53 is locked to the dial 51 by a dowel 55 which projects forwardly from the head 54 and fits into a slot 56 in the dial boss 50. A washer 57 seats against the front face of the dial 51, and seated in turn against this washer is a bearing sleeve 58. The inner part 59 of a two-piece pitman 59—60 is journaled on this sleeve 58 and the latter has an enlarged head 61 to receive the pressure of a nut 62 threaded on the pin 53 and serving to selectively hold the pin and dial 51 against turning movement with respect to the disc 47. The outer part 60 of the pitman is bifurcated at its inner end to form forks 63 for straddling part 59 and making a pivotal connection therewith by a pin 64. At its outer end the outer pitman part has a forwardly offset portion from the free end of which a necked pintle 65 projects rearwardly in parallel relation to the pin 53. The upper end of the rod 12 has an enlarged head 66 journaled in the boss 27 and formed with a cross-bore 67 for receiving the neck of the pintle 65. It will be noted that the outer end of the inner pitman part 59 has a detent 68 formed therein for receiving a positioning ball 69 which is seated in the outer part 60 between the forks 63 and is urged toward the inner part by a spring 70. In this manner forward pivotal movement of the outer pitman part is yieldingly resisted.

In Fig. 1 the rod 12 is shown at the start of its down or dough dispensing and forming stroke. As the rod moves downwardly carrying the valve component 14 and the piston 13, the rod will slide through the hub of the floating valve component 15 and a charge of dough will be pulled from the hopper into the valve chamber 17. This charge is isolated when the valve component 14 reaches the floating component and thereby closes the check valve to isolate the valve chamber from the hopper. After the closure of the check valve 14—15, the forming piston 13 leaves the discharge tube 18 and further downward movement of the piston and check valve with the rod 12 will extrude the charge of dough past the piston. As the rod then moves upward, the forming piston 13 re-enters the discharge tube 18, a doughnut ring is cut-off, and the valve component 14 leaves the floating component 15. Further upward movement eventually brings the hub of the piston 13 against the underside of the hub 21 of the floating component and raises the latter. This upward movement of the floating valve component draws a new charge of dough from the hopper and through the valve openings 24 into the valve chamber 17. The forming mechanism is then ready for another cycle. It will be apparent from the foregoing that the size of each charge of dough dispensed will be dependent upon the length of stroke of rod 12 and it is for this reason that the afore-described mechanism provides for an adjustment of the throw of the disc or crank 47.

In order for the operator of the equipment to be able to gauge the adjustment of the stroke of the rod 12, I have provided the dial 51 with a set of radiating scale indicia 71 which have a mark 72 on the disc 47 as a reference point. Thus, to adjust the size of doughnut rings dispensed the operator need only loosen the nut 62, turn the dial 51 until the correct indicium is opposite to the reference mark 72, and then retighten the nut.

To prepare the device for cleaning the operator need only disengage the pintle 65 from the head of the rod 12 by pivoting the outer pitman part 60 forwardly about pin 64, and then loosen the nuts 32 to free the power assembly from the rod and bail 25. Disassembly for cleaning is completed by lifting the rod 12 until its enlarged head is above the boss 27 so that the shank of the rod can be moved laterally through the access-way 28 to be then lifted with its related forming piston 13 and check valve 14—15 out of the hopper 16.

The wiring cord 73 for the motor 41 passes through handle bar 37 and for starting and stopping the motor there is provided a thumb switch 74. It is desirable that the device be incapable of stopping operation when the forming piston 13 is without the discharge tub 18. To insure this, a second switch 75 of a self-closing type, which is opened by pressing a spring-loaded plunger 76, is wired by cord 78 in parallel with thumb switch 74 and is mounted on the front plate 33 of the gear box. This plunger 76 extends radially through the boss 46 and is arranged to be urged upwardly to open switch 75 by a cam 77 formed in shaft 45 and best shown in Fig. 6. The cam 77 is located such as to close switch 75 during the latter part of the return upstroke of the rod 12, in other words, during the non-dispensing part of the cycle. Similarly, the switch 75 could be loaded to self-open rather than self-close in which case the cam 77 would be positioned so as to close the switch 75 during all of the dough dispensing part of the cycle.

It will be apparent that the rod 12 could be utilized to actuate other dough forming mechanism than that illustrated for extruding doughnut rings, and hence I do not intend to limit the present invention to this one dough forming embodiment.

It is thought that the present invention and the manner of its operation will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In a dough former, a hopper assembly, dough forming means operably associated with said assembly and including a rod journal-mounted on the assembly for endwise reciprocating movement, a crank carried by said hopper assembly and journal-mounted for rotation about a crank axis occupying a plane which is perpendicular to said rod, a dial presenting a round boss which is journaled for selective turning movement in said crank about a boss axis extending in parallel spaced relation to said crank axis, a pin extending longitudinally through said boss and locked to the dial to turn in unison therewith, said pin having its longitudinal axis offset from said boss axis whereby turning of the dial relative to said crank selectively varies the throw of said pin axis from said crank axis, a pitman journal-mounted on said pin and operably connected to said rod, and means on said pin for selectively holding said dial and crank together whereby the same will turn in unison to maintain the pin throw selected.

2. In a dough former, a hopper assembly, dough forming means operably associated with said assembly and including a rod journal-mounted on the assembly for endwise reciprocating movement, a crank carried by said hopper assembly and journal-mounted for rotation about a crank axis occupying a plane which is perpendicular to said rod, a dial presenting on its back a round boss which is journaled for selective turning movement in said crank about a boss axis extending in parallel spaced relation to said crank axis, a pin having an enlarged head bearing against the back of the crank and having its shank extending forwardly through said boss, said pin being locked to the dial to turn in unison therewith and having its longitudinal axis offset from said boss axis whereby turning of the dial relative to said crank selectively varies the throw of said pin axis from said crank axis, a pitman journal-mounted on said pin forwardly of said dial and operably connected to said rod, a nut threaded onto said pin forwardly of said link, the spacer means extending between said nut and dial for transferring pressure from the nut to the dial to thereby selectively force the latter against said crank whereby the dial and crank will turn in unison to maintain the pin throw selected.

3. In a dough former, a hopper assembly, dough forming means operably associated with said assembly and including a rod journal-mounted on the assembly for endwise reciprocating movement, a crank carried by said hopper assembly and journal-mounted for rotation about a crank axis occupying a plane which is perpendicular to said rod, a dial presenting on its back a round boss which is journaled for selective turning movement in said crank about a boss axis extending in parallel spaced relation to said crank axis, a pin having an enlarged head bearing against the back of the crank and having its shank extending forwardly through said boss, said pin being locked to the dial to turn in unison therewith and having its longitudinal axis offset from said boss axis whereby turning of the dial relative to said crank selectively varies the throw of said pin axis from said crank axis, a spacer on the pin forwardly of said dial, a bearing sleeve on the pin forwardly of said spacer, a pitman journal-mounted on said bearing sleeve and operably connected to said rod, and a nut threaded onto said pin forwardly of said bearing sleeve whereby pressure may be selectively exerted against said dial via said bearing sleeve and spacer to thereby force the dial against the crank whereby the dial and crank will turn in unison to maintain the pin throw selected.

4. In a dough former, a hopper assembly, dough forming means operably associated with said assembly and including a rod journal-mounted on the assembly for endwise reciprocating movement, a crank carried by said hopper assembly and journal-mounted for rotation about a crank axis occupying a plane which is in perpendicular to said rod, a pin assembly extending through said crank in parallel spaced relation to said crank axis, a pitman having inner and outer parts pivotally connected together with said inner part being journal-mounted on said pin assembly, means on the pin assembly for selectively varying the throw of the longitudinal axis thereof from said crank axis, said rod having a hole therethrough parallel to said crank axis and said outer part of the pitman providing a pintle detachably fitting into said hole, the pivotal connection between said parts of the pitman being such that said outer part thereof may be selectively swung into and out of said hole.

5. In a dough former, a hopper assembly presenting a boss having a through-bore extending longitudinally with respect to the hopper assembly, a rod extending into said hopper assembly for carrying dough forming means and having an enlarged head portion which is journaled for reciprocating endwise movement in said boss, the latter having a longitudinal access slot formed therein of a size through which the rod proper can be laterally introduced into said through-bore, drive means carried by said hopper assembly for driving said rod and including a pitman facing said access slot and comprising inner and outer parts pivotally connected together such that said outer part is swingable toward and away from said access slot, a hole in said enlarged head portion of the rod and exposed by said access slot, and a pintle provided by said outer part of the pitman and detachably fitting into said hole.

6. In a dough former, a hopper assembly presenting a boss having a through-bore extending longitudinally with respect to the hopper assembly a rod extending into said hopper assembly for carrying dough forming means and having an enlarged head portion which is journaled for reciprocating endwise movement in said boss, the latter having a longitudinal access slot formed therein of a size through which the rod proper can be laterally introduced into said through-bore, drive means carried by said hopper assembly for driving said rod and including a pivoted part which is swingable toward and away from said access slot, a hole in said enlarged head portion of the rod and exposed by said access slot, and a pintle provided by said pivoted part and detachably fitting into said hole.

7. In a dough former, a hopper assembly, a rod for carrying dough forming means and journal-mounted on the hopper assembly for endwise reciprocating movement, a gear box detachably connected to said hopper assembly, an electric motor mounted on said gear box, a handle bar mounted on the gear box, an electric circuit for said motor including a manual switch mounted on the handle bar and a loaded switch carried by the gear box and normally self-urged to a given position, said switches being wired in parallel, an output shaft provided by the gear box, means within the gear box for transferring power at reduced speed from the motor to the output shaft, a cam driven by said output shaft and operatively associated with said loaded switch to move it out of said given position once during each rotation of the shaft, and a pitman operatively associated with said output shaft and detachably pivotally connected to said rod to reciprocate the latter once each revolution of said output shaft.

8. In a dough former, a hopper assembly, a rod for carrying dough forming means and journal-mounted on the hopper assembly for endwise reciprocating movement, an electrical motor carried by the hopper assembly, an electric circuit for the motor including a manual switch and a loaded switch which is normally self-urged to a given position, said switches being wired in parallel, an output shaft, means for transferring power from the motor to said output shaft, a cam driven by the output shaft and operatively associated with said loaded switch to move it out of said given position once during each rotation of the shaft, and means operatively associated with said output shaft and said rod reciprocating the latter once each revolution of said output shaft.

9. In a dough former, a hopper assembly, dough forming means operatively mounted in said assembly for cyclical endwise reciprocating movement, each cycle of said dough forming means having a dough dispensing part and a non-dispensing part, a power assembly mounted on said hopper assembly and operatively interconnected with said dough forming means, said power assembly including an electric motor, an electric circuit for said motor including a manual switch and a self-opening switch carried by the power assembly and wired in parallel, and a cam operatively associated with said power assembly for closing said self-opening switch during said dispensing part of each said cycle of the dough forming means whereby the dough former can only cease operation during a nondispensing part of the cycle.

10. In a dough former, a hopper assembly, dough forming means operatively mounted in said assembly for cyclical endwise reciprocating movement, each cycle of said dough forming means having a dough dispensing part and a non-dispensing part, a power assembly mounted on said hopper assembly and operatively interconnected with said dough forming means, said power assembly including an electric motor, an electric circuit for said motor including a manual switch and self-closing switch carried by the power assembly and wired in parallel, and a cam operatively associated with said power assembly for closing said self-closing switch during said non-dispensing part of each said cycle of the dough forming means whereby the dough former can only cease operation during a non-dispensing part of the cycle.

References Cited in the file of this patent

UNITED STATES PATENTS

| Number | Name | Date |
|---|---|---|
| 811,426 | Mitchell | Jan. 30, 1906 |
| 1,191,855 | Tuszka | July 18, 1916 |
| 1,663,267 | Colby | Mar. 20, 1928 |
| 1,866,061 | Schoel | July 5, 1932 |
| 2,312,157 | Galbreath et al. | Feb. 23, 1943 |
| 2,609,966 | Henry | Sept. 9, 1952 |
| 2,635,560 | Coyne | Apr. 21, 1953 |
| 2,637,282 | Belshaw et al. | May 5, 1953 |
| 2,669,949 | Cottingham | Feb. 23, 1954 |